US010995280B2

(12) United States Patent
Martin et al.

(10) Patent No.: US 10,995,280 B2
(45) Date of Patent: *May 4, 2021

(54) SCAVENGER COMPOSITIONS FOR SULFUR SPECIES

(71) Applicant: Innophos, Inc., Cranbury, NJ (US)

(72) Inventors: Jean Valery Martin, Princeton, NJ (US); Giovanni Onnembo, Wayne, NJ (US); Evelyn Olanipekun, Newark, NJ (US); Kevin Kempton, Woodbridge, NJ (US); Arbnor Ibraimi, Wanaque, NJ (US); William Carton, New Monmouth, NJ (US)

(73) Assignee: Innophos, Inc., Cranbury, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/791,615

(22) Filed: Feb. 14, 2020

(65) Prior Publication Data

US 2020/0181507 A1  Jun. 11, 2020

Related U.S. Application Data

(63) Continuation of application No. 16/067,888, filed as application No. PCT/US2017/012468 on Jan. 6, 2017, now Pat. No. 10,767,118.

(60) Provisional application No. 62/276,472, filed on Jan. 8, 2016.

(51) Int. Cl.
*C10G 29/20* (2006.01)
*C08L 95/00* (2006.01)

(52) U.S. Cl.
CPC ............. *C10G 29/20* (2013.01); *C08L 95/00* (2013.01); *C10G 2300/207* (2013.01)

(58) Field of Classification Search
CPC .... C10G 29/20; C10G 2300/207; C08L 95/00
See application file for complete search history.

(56) References Cited

U.S. PATENT DOCUMENTS

| | | | |
|---|---|---|---|
| 9,068,128 B2 | 6/2015 | Stark et al. | |
| 9,150,707 B2 | 10/2015 | Schroeder | |
| 9,334,448 B2 | 5/2016 | Stark et al. | |
| 9,441,092 B2 | 9/2016 | Martin | |
| 9,932,478 B2 | 4/2018 | Mouazen et al. | |
| 10,066,079 B2 | 9/2018 | Martin | |
| 2009/0242461 A1* | 10/2009 | Eldin | C10G 29/20 208/236 |
| 2012/0168350 A1 | 7/2012 | Mironov et al. | |
| 2012/0329930 A1* | 12/2012 | Stark | C08G 12/06 524/317 |
| 2013/0092597 A1* | 4/2013 | Stark | C10C 3/023 208/45 |
| 2014/0209510 A1* | 7/2014 | Harrington | C07C 217/08 208/207 |
| 2014/0231311 A1* | 8/2014 | Sandu | C10G 21/16 208/240 |
| 2014/0305845 A1* | 10/2014 | Ramachandran | B01D 53/1493 208/240 |
| 2015/0025258 A1* | 1/2015 | Poland | C07F 3/06 554/75 |
| 2015/0218342 A1* | 8/2015 | Martin | C08K 5/0008 106/157.1 |
| 2016/0060520 A1 | 3/2016 | Panchalingam et al. | |
| 2016/0289450 A1* | 10/2016 | Mouazen | C08L 53/02 |
| 2017/0008802 A1* | 1/2017 | Martin | C08K 5/0091 |
| 2017/0022109 A1* | 1/2017 | Poland | C08L 95/00 |
| 2017/0260095 A1* | 9/2017 | Song | C08K 9/12 |
| 2018/0216014 A1* | 8/2018 | Weers | C10G 21/16 |
| 2018/0223101 A1* | 8/2018 | Prejean | C08L 23/0884 |
| 2019/0010403 A1* | 1/2019 | Subramaniyam | B01D 53/78 |
| 2020/0024454 A1* | 1/2020 | Prejean | C08K 3/32 |

* cited by examiner

*Primary Examiner* — Ellen M Mcavoy
(74) *Attorney, Agent, or Firm* — David LeCroy

(57) ABSTRACT

A scavenger composition comprising a carrier and an active metal, wherein the carrier is present in an amount of about 1.0 wt % to about 99.0 wt. %, based on total weight of the composition, and the active metal is present in an amount of about 1.0 wt % to about 99.0 wt. %, based on total weight of the composition, wherein the active metal is a metal salt or metal chelate, and wherein the metal is chosen from iron, copper, molybdenum and zinc.

18 Claims, No Drawings

SCAVENGER COMPOSITIONS FOR SULFUR SPECIES

CROSS REFERENCE TO RELATED APPLICATIONS

The present application is a continuation of U.S. application Ser. No. 16/067,888 filed 3 Jul. 2018, which is a 371 National Stage entry of International Application No. PCT/US2017/012468 filed 6 Jan. 2017, which claims priority to U.S. Application No. 62/276,472 filed 8 Jan. 2016, the contents of which are incorporated herein by reference.

BACKGROUND OF THE INVENTION

Field of the Invention

The present invention is directed towards scavenger compositions for inactivating at least one sulfur species. More particularly, the present invention relates to hydrogen sulfide scavengers additives for asphalt.

According to the American Society of Testing Material ('ATSM'), asphalt is defined as "a dark brown to black cementitious material in which the predominant constituents are bitumens which occur in nature or are obtained in the petroleum processing" (i.e., obtained by fractional distillation of petroleum). In industry, the terms asphalt and bitumen are used interchangeably, with asphalt more commonly used in the United States, and bitumen more commonly used outside the United States. For the purpose of the present application, as well as for clarity, the term bitumen is used to refer to the 'dark brown to black cementitious material', while asphalt is used to refer to asphalt concrete or asphalt cement; that is, the combination of at least bitumen and aggregates.

Bitumen used in forming asphalt is available in different grades, depending upon the source of the crude oil from which the bitumen is derived. Further, there are various ways to grade bitumen, such as penetration grading, viscosity grading and performance grading. For penetration grading, bitumen is classified by the depth to which a standard needle penetrates the bitumen under specified test conditions. This needle test characterization indicates the hardness of bitumen, with a lower penetration indicating a harder bitumen. Specifications for penetration graded bitumen normally state the penetration range for a grade (e.g., 50/70). Viscosity graded bitumens are graded and specified by their viscosity at a standard temperature (typically 135° C.). Specifications for viscosity graded bitumen normally give the nominal viscosity preceded by a V (e.g. V1500). Unfortunately, penetration and viscosity grading are somewhat limited in their ability to fully characterize bitumen for use in hot mixture asphalt ('HMA') pavement.

Performance grading incorporates tests and specifications that more accurately and fully characterize bitumen for use in HMA pavements. For bitumen, this involves expected climatic conditions as well as aging considerations. Like the penetration and viscosity grading systems, performance grading uses a common battery of tests, yet also specifies that a particular bitumen must pass these tests at specific temperatures that are dependent upon specific climatic conditions in the area of use. Performance grading is reported using two numbers—the first being the average seven-day maximum pavement temperature (° C.) and the second being the minimum pavement design temperature likely to be experienced (° C.). For example, a performance grade ('PG') 58-28 bitumen is intended for use where the average seven-day maximum temperature is 58° C. and the expected minimum pavement temperature is −28° C. As a general rule, performance grade bitumen that differ in the high and low temperature specification by 90° C. or more typically require some sort of modification.

Modified bitumens are bituminous binders whose performance properties (e.g., elasticity, adhesive or cohesive strength) have been modified by one or more additives. These additives include fillers, extenders, polymers, oxidants, rejuvenators, antioxidants, antistripping agents, waste materials (e.g., crumb rubber) and polyphosphoric acid, among others.

Asphalts often require modification in order to meet specifications. Additives can be added to the bitumen or asphalt to aid it in meeting those specifications. In this respect, various types of additives can be added to meet different types of improvements. These improvements include lower stiffness (or viscosity) at the high temperatures associated with construction in order to facilitate pumping of the liquid bitumen, as well as mixing and compaction of HMA; higher stiffness at high service temperatures for reducing rutting and shoving; lower stiffness and faster relaxation properties at low service temperatures in order to reduce thermal cracking; and increased adhesion between the bitumen and the aggregate in the presence of moisture to reduce the likelihood of stripping (i.e., the separation of the bitumen from the aggregate).

Modifiers include various types of polymers that can be added to the bitumen to increase HMA stiffness at high service temperatures, increase HMA elasticity at medium service temperatures to resist fatigue cracking, or decrease HMA stiffness at low temperatures to resist thermal cracking. Antistripping agents can be added to the bitumen or asphalt to minimize stripping of bitumen from aggregates. Extenders can be added as a substitute for a portion of the bitumen to decrease a portion of the bitumen required, for example, when recycling asphalt.

Often the bitumen that an asphalt producer receives does not meet the performance grade required for the location in which the asphalt is to be laid. For example, the bitumen available to the producer may be PG 64-22 bitumen suitable for normal traffic, but regulations or geography requires PG 70-22 bitumen for slower heavy traffic, or even a PG 76-22 bitumen for heavy standing or interstate conditions. In order to meet the required grade, the bitumen can be chemically modified by adding an appropriate amount of polyphosphoric acid ('PPA'). This PPA modification improves the high temperature rheological properties of the bitumen without affecting its low temperature rheological properties (i.e., the PPA addition increases the average 7-day maximum temperature from 64 to 70 or higher, depending on the amount of PPA added, while the minimum temperature remains the same). Addition of the PPA can also increase the stiffness of the bitumen, depending on the source of the bitumen.

Most bitumens contain organosulfur compounds, resulting in an overall sulfur content of up to 4% of the bitumen. As the bitumen is heated, sulfur is released from the bitumen in the form of hydrogen sulfide ($H_2S$) or other volatile sulfur compounds (e.g., mercaptans). Hydrogen sulfide emissions are regulated so as to limit operational exposure for health and safety reasons. Therefore, there is a need to limit the amount of $H_2S$ emitted from bitumen in the processing of asphalt through both engineering and/or chemical controls.

SUMMARY OF THE INVENTION

Disclosed herein is a scavenger composition for reducing hydrogen sulfide emissions from asphalt comprising a carrier in an amount of about 1.0 wt % to about 99.0 wt. %, based on total weight of the composition, and an active metal in an amount of about 99.0 wt % to about 1.0 wt. %, based on total weight of the composition. The active metal is a metal salt or metal chelate, and is chosen from iron, copper, molybdenum, nickel and zinc.

In certain embodiments, the scavenger composition can further include a suspension aid in an amount of about 0.01 wt % to about 10.0 wt. %, based on total weight of the composition, and a dispersant in an amount of about 0.01 wt % to about 10.0 wt. %, based on total weight of the composition. As not all active metals are readily suspendable in the carrier in and of itself, the addition of the suspension aid and dispersant is advantageous in producing a stable suspension of the active metal in the carrier.

The active metal is typically in powdered form having a diameter of about 100 microns or less. Preferably, the active metal has a diameter of about 20 microns or less.

As noted above, the active metal is a metal salt or metal chelate, and is chosen from iron, copper, molybdenum, nickel and zinc. Examples of such suitable active metal include copper aspartate; copper carbonate; copper citrate; copper gluconate; copper bis-glycinate; copper oxides; copper oxalate; copper sulfate; iron aspartate; iron bis-glycine; iron citrate; iron fumarate; iron gluconate; iron bis-glycinate; iron sulfate; molybdenum aspartate; molybdenum bis-glycine; molybdenum citrate; molybdenum fumarate; molybdenum gluconate; molybdenum glycinate; molybdenum sulfate; nickel aspartate; nickel bis-glycine; nickel citrate; nickel fumarate; nickel gluconate; nickel bis-glycinate; nickel sulfate; zinc acetate; zinc arginate; zinc ascorbate; zinc aspartate; zinc carboxylate; zinc gluconate; zinc bis-glycinate; zinc methionate; zinc oxide; zinc picolinate; and zinc sulfate. In certain embodiments, the active metal is a copper-based active metal.

The present invention is further directed towards bitumen or asphalt comprising the scavenger composition described herein. In certain embodiments, the bitumen or asphalt is modified with one or more additives. When the bitumen or asphalt is modified with polyphosphoric acid, the active metal is preferably a copper-based active metal.

When the bitumen or asphalt is modified with the scavenger composition and heated to 100° C. or greater, particularly 130° C. or greater, hydrogen sulfide emissions from the bitumen or asphalt are reduced to about 10 ppm or less, Further described herein is a process for preparing a scavenger composition comprising adding to a carrier an active metal in a ratio of from about 1.0:4.0 to about 4.0:1.0 carrier to active metal, wherein the active metal is a metal salt or metal chelate chosen from iron, copper, molybdenum, nickel and zinc, and wherein the scavenger composition is able to reduce hydrogen sulfide emissions, Because the active metal is typically in powder form, one or more of the active metals when added to the carrier may settle out. Therefore, in certain embodiments wherein when the active metal is not able to remain suspended in the carrier, the process further comprises adding to the carrier a suspension aid in an amount of about 0.01 wt % to about 10.0 wt % and a dispersant in an amount of about 0.01 wt % to about 10.0 wt %, based on total weight of the composition, wherein the suspension aid and dispersant are able to provide a stable suspension of the active metal in the carrier. Preferably the suspension aid and dispersant are added to the carrier prior to adding the active metal.

The present invention further provides a process for reducing hydrogen sulfide emissions from asphalt or bitumen comprising adding to the asphalt or bitumen the scavenger composition described herein. In those embodiments where the bitumen or asphalt is further modified with polyphosphoric acid, the active metal is preferably a copper-based active metal.

DETAILED DESCRIPTION OF THE INVENTION

Disclosed herein is a composition in the form of a suspension, dispersion or slurry that is useful as a hydrogen sulfide ($H_2S$) scavenger. As used herein the terms slurry, dispersion and suspension can be used interchangeably. The present invention can be used with multiple substances, most preferably bitumen or asphalt, to provide the benefits of a hydrogen sulfide scavenger, as well as improved rheology of the substance to which it is added (e.g., asphalt containing the suspension). The scavenger composition or suspension or slurry further provides the ability to add polyphosphoric acid ('PPA') and/or the slurry at any point in the asphalt supply chain (i.e., from asphalt preparation at the refinery up to asphalt application and final use).

Examples of points of addition of the scavenger composition in the asphalt supply chain include, both inline and hatch blending—

1) Bitumen discharge line from a refinery to storage tank.
2) Refinery storage tank to railcar, truck, or barge.
3) Bitumen discharge line from railcar, truck, or barge to storage tank.
4) Any point from storage tank and polymer and/or sulfur injection lines to final destination (tank, truck, barge).
5) Any point from storage tank and PPA injection point to final destination (tank, truck, barge).
6) The creation of a scavenger/bitumen concentrate to let down into un-scavenged bitumen.
7) Direct addition to storage tank, truck, barge with or without mixing capabilities.
8) Addition at either the positive or negative pressure points of an injection line.

The scavenger composition according to the present invention is comprised of a suspension media or carrier, a suspension aid, a dispersant, and an active metal in the form of a metal salt or metal chelate. The composition according to the present invention can be used with a variety of substances—preferably asphalt—to act as a hydrogen sulfide scavenger and improve the rheology of the substance to which it is added. Further, when used in asphalt modified with polyphosphoric acid ('PPA'), the scavenger composition is compatible with such PPA-modified asphalt and allows for the addition of the PPA and/or the composition at any point in the asphalt supply chain (e.g., from asphalt preparation at the refinery up to asphalt application and use).

Suspension medias or carriers useful in the composition of the present invention include glycerol, polypropylene glycol, polyethylene glycol, white mineral oil, mineral spirits (e.g., petroleum hydrocarbon solvent), hydrotreated light petroleum distillate, white spirits, Stoddard solvent, aliphatic naphtha with a flash point ('FP') of about 38-42° C., odorless mineral spirits (e.g., naphtha (petroleum), heavy alkylate with PP of about 43° C.), and hydrotreated heavy petroleum distillate (e.g., $C_{11}$-$C_{13}$ isoparaffinic liquid with flash point>about 61° C.). The suspension media is typically present in the composition in an amount of about 1.0 to about 99.0 wt %, based on total weight of the composition, more typically in an amount of about 30.0 to about 80.0 wt %, and even more typically in an amount of about 40.0 to about 60.0 wt %.

Because one or more of the metal salts or metal chelates have a propensity to settle in one or more of the suspension media, the scavenger composition can also include a suspension aid or rheology modifier to suspend the active metal in the carrier. Examples of suitable suspension aids include polysaccharides such as Xanthan or guar gum (including anionic, hydrophobic and/or cationic modified polysaccharides), fumed silica, modified bentonite (montmorillonite), hectorites, castor oil derivatives (e.g., polyamide modified derivatives), polyamides and modified polyamides, and polyolefins and modified polyolefins. Also useful are polymers such as polyacrylates that have thickening properties. When used, the suspension aid is typically present in the composition in an amount of about 0.01 to about 10.0 wt %, based on total weight of the composition, more typically in an amount of about 0.01 to about 5.0 wt %, and even more typically in an amount of about 0.01 to about 2.0 wt %.

In addition to the carrier and suspension aid, the scavenger composition according to the invention includes a dispersant or wetting agent. Useful dispersants include sodium acid pyrophosphate, sodium polysulfonate (e.g., sodium poly-naphthalene sulfonate and sodium potassium poly-naphthalene sulfonate), sodium alkyl sulfosuccinate, soy lecithin (phospholipid), hydroxyl-functional carboxylic acid esters, salts of unsaturated polyamine amides and lower molecular weight acidic polyesters, and alkyl amine sulfonates (e.g., isopropylamine dodecylbenzene sulfonate). When present, the dispersant is typically present in the composition in an amount of about 0.01 to about 10.0 wt %, based on total weight of the composition, more typically in an amount of about 0.01 to about 5.0 wt %, and even more typically in an amount of about 0.01 to about 2.0 wt %.

Active metals useful in the present invention include metal salts and metal chelates able to reduce or prevent or trap the formation of hydrogen sulfide from organosulfur compounds. The active metal is typically present in the composition in an amount of about 1.0 to about 99.0 wt %, based on total weight of the composition, more typically in an amount of about 20.0 to about 70.0 wt %, and even more typically in an amount of about 40.0 to about 60.0 wt %. These active metals come in a variety of particle sizes and shapes. So that the active metal is better suspended in the carrier, it is preferred that the active metal particle or powder is smaller in size, for example, about 100 microns or less in diameter, preferably about 20 microns or less. The ratio of active metal to carrier can be from about 1.0:4.0 to about 4.0:1.0, more typically from about 1.5:3.5 to about 3.5:1.5, and even more typically from about 2.0:3.0 to about 3.0:2.0.

Examples of active metals (both salts and chelates) useful in scavenger compositions according to the invention include iron, copper, molybdenum and zinc salts and chelates of carboxylates, amino polycarboxylates (e.g., EDTA and glycine), phosphates, sulfates and oxides (e.g., I, II, III or IV). These include, for example, copper aspartate; copper carbonate; copper citrate; copper gluconate; copper bisglycinate; copper oxides (e.g., I and II); copper oxalate; copper sulfate; iron aspartate; iron bis-glycine; iron citrate; iron fumarate; iron gluconate; iron bis-glycinate; iron sulfate; molybdenum aspartate; molybdenum bis-glycine; molybdenum citrate; molybdenum fumarate; molybdenum gluconate; molybdenum glycinate; molybdenum sulfate; nickel aspartate; nickel bis-glycine; nickel citrate; nickel fumarate; nickel gluconate; nickel bis-glycinate; nickel sulfate; zinc acetate; zinc arginate; zinc ascorbate; zinc aspartate; zinc carboxylate; zinc gluconate; zinc bis-glycinate; zinc methionate; zinc oxide; zinc picolinate; and zinc sulfate. Preferably the active metal is a copper-based active metal.

The present invention further comprises a process for preparing a hydrogen sulfide scavenger composition comprising adding to a carrier an active metal in a ratio of from about 1.0:4.0 to about 4.0:1.0. When the active metal is not able to be suspended in the carrier, the process can further comprise adding to the carrier a suspension aid, which is typically present in the composition in an amount of about 0.001 wt % to about 10.0 wt %, based on total weight of the composition, and a dispersant in an amount of about 0.001 wt % to about 10.0 wt %, based on total weight of the composition. Preferably, the suspension aid and dispersant are added prior to adding the active metal.

The present invention is further directed towards bitumen or asphalt modified with the hydrogen sulfide scavenger composition described herein. In another embodiment, the present invention is directed towards a method of reducing hydrogen sulfide emissions from bitumen or asphalt comprising adding to the bitumen or asphalt the hydrogen sulfide scavenger composition described herein in an amount of about 0.001 wt % to about 10.0 wt %, based on total weight of the modified bitumen or asphalt, more preferably in an amount of about 0.10 wt % to about 3.0 wt %. In a further embodiment, the bitumen or asphalt has been modified with PPA. When modified with PPA, the scavenger composition preferably contains a copper-based active metal, wherein the active metal is present in the scavenger composition in an amount sufficient to reduce hydrogen sulfide emissions from the bitumen or asphalt when heated to an amount of about 10 ppm or less. Preferably, the copper-based active metal is present in the scavenger composition in an amount of about about 40.0 to 60.0 wt %, based on total weight of the scavenger composition.

EXAMPLES

The following scavengers were used in the Examples provided below—

TABLE 1

| Scavengers | |
|---|---|
| Scavenger A | 40% copper bisglycinate in 60% glycerol |
| Scavenger B | Copper bisglycinate (powder) |
| Scavenger C | Copper Carbonate scavenger composition |
| Scavenger D | Copper carbonate (low bulk density powder) |
| Scavenger E | Copper carbonate (high bulk density powder) |
| Scavenger F | Zinc carboxylate in 10-30% naphtha oil |
| Scavenger G | Copper (I) oxide |
| Scavenger H | Copper (II) oxide |
| Scavenger I | Iron bisglycinate |
| Scavenger J | Zinc bisglycinate |

[1] Scavenger C is a scavenger composition according to the invention and is comprised of a suspension media, suspension aid, dispersant and metal chelate. The active metal is copper carbonate suspended in mineral oil (suspension media or carrier) with modified polyolefin (suspension aid) and alkyl amine sulfonate (dispersant).

In addition to Scavenger C above, following are non-limiting examples of other scavenger compositions according to the invention—

Scavenger Formulation Example 1

A scavenger formulation was prepared by mixing 479.8 grams ('g') of low density copper carbonate (copper (II) hydroxide with $d_{50}$=2.5 microns) (active metal) with 500.02 g of glycerol (carrier), 0.201 g of xanthan gum (suspension aid), and 20.07 g of sodium polysulfonate (dispersant) in a 2 liter beaker. The formulation was mixed for 60 minutes under sufficient speed to achieve a stable suspension having a Hegman gauge value of 6. The formulation contained about 48% by weight copper carbonate with a viscosity of 542 cP at 66° C.

Scavenger Formulation Example 2

A scavenger formulation was prepared by charging 2571 lbs of white mineral oil (carrier) into a mixing vessel. 39 lbs of modified polyolefin (suspension aid, 25% active) and 56 lbs of alkyl amine sulfonate (dispersant) were then added to the vessel with mixing. Once uniform, 2665 lb of copper carbonate (copper (H) carbonate hydroxide) (active metal) was added under agitation. The formulation was mixed for 30 minutes and then processed in a small media mill for 180 minutes resulting in a stable suspension having a Hegman gauge value of 6.75. The formulation contained about 50% by weight copper carbonate with a viscosity of 1008 cP at 25° C.

Scavenger Formulation Example 3

A scavenger formulation was prepared by charging 2581 lbs of white mineral oil (carrier) into a mixing vessel. 39 lbs of modified polyolefin (suspension aid, 25% active) and 57.5 lbs of alkyl amine sulfonate (dispersant) were then added to the vessel with mixing. Once uniform, 2684 lb of copper carbonate (copper (11) carbonate hydroxide) (active metal) was added under agitation. The formulation was mixed for 30 minutes and then processed in a small media mill for 235 minutes resulting in a stable suspension having a Hegman gauge value of 6.5. The formulation contained about 50% by weight copper carbonate with a viscosity of 1245 cP at 25° C.

Scavenger Formulation Example 4

A scavenger formulation was prepared by charging 2661 lbs of white mineral oil (carrier) into a mixing vessel. 39 lbs of modified polyolefin (suspension aid, 25% active) and 57.5 lbs of alkyl amine sulfonate (dispersant) were then added to the vessel with mixing. Once uniform, 2684 lb of copper carbonate (copper (II) carbonate hydroxide) (active metal) was added under agitation. The formulation was mixed for 30 minutes and then processed in a small media mill for 180 minutes resulting in a stable suspension having a Hegman gauge value of 6.75. The formulation contained about 50% by weight copper carbonate with a viscosity of 1047 cP at 25° C.

Example 1—Efficacy of Different Metal Chelates as Scavengers various metal chelates in powder form (see Table 1 above) were compared against each other as scavengers in two different sources of bitumen to determine their efficacy in reducing $H_2S$ emissions. The scavengers were added to bitumen in an amount of 0.5 wt % based on total weight of the scavenger modified bitumen after the bitumen was heated to either 160° C. or 180° C. and held at that temperature for one hour. $H_2S$ measurements were taken at 5 minutes after addition and 1 hour after addition. The results of the efficacy of the scavengers in reducing $H_2S$ emissions are presented in the following table—

TABLE 1

$H_2S$ Release from Bitumen with Scavenger Added

| Scavenger | Peak $H_2S$ Emission (ppm) | $H_2S$ Emission 5 minutes after addition | $H_2S$ Emission 60 minutes after addition |
|---|---|---|---|
| PG 64-22 | I | 57 | 17 | 3 |
| Bitumen | B | 15 | 7 | 3 |
| at 160° C. | J | 25 | 9 | 5 |
| PG 64-22 | I | 3 | 1 | 2 |
| Bitumen | B | 2 | 1 | 2 |
| at 180° C. | J | 4 | 2 | 3 |
| PG 70-22 | I | 5 | 1 | 4 |
| Bitumen at | B | 2 | 1 | 1 |
| 160° C. | J | 6 | 2 | 6 |
| PG 70-22 | I | 52 | 8 | 12 |
| Bitumen at | B | 12 | 4 | 1 |
| 180° C. | J | 10 | 5 | 1 |

The above results illustrate that for the PG 64-22 bitumen, addition of Scavengers I (iron) and B (copper) resulted in lower $H_2S$ emissions than Scavenger J (zinc). Further, the PG 64-22 bitumen did not digest Scavenger J as easily as Scavengers I and B (i.e., some of Scavenger J conglomerated on the surface of the bitumen instead of blending into the bitumen), resulting in a less homogenous blend. For the PG 70-22 bitumen, only Scavenger B was completely digested by the bitumen. Scavengers I and J were not, resulting in less homogenous blends for these two scavengers. Scavenger B also exhibited the lowest $H_2S$ emissions at both temperatures. These results suggest that copper functions as a better metal chelate in bitumen than iron or zinc.

Example 2—$H_2S$ Analysis of Bitumen (Open System) Bitumen with Sulfur (0.005%) but without Scavenger Bitumen with added sulfur but free of any scavenger was evaluated for hydrogen sulfide ($H_2S$) generation as follows. 300 g of BP PG 64-22 bitumen was charged into a steel quart can equipped with a lid having port holes for a propeller blade, thermocouple and stopcock (for $H_2S$ measurements). The bitumen was heated to 160° C. while agitating at 300 rpm. Once the desired temperature was reached, the bitumen was held at that temperature for 15 minutes. Sulfur was then added to the bitumen in an amount of 0.005% by total weight of bitumen (time=0 minutes). An $H_2S$ reading was taken after holding at 160° C. for 15 minutes, with $H_2S$ measurements continued to be taken every 10 minutes until no $H_2S$ was detected. The results of the $H_2S$ release were as follows—

TABLE 2

$H_2S$ Release from Bitumen with sulfur additive

| Time (minutes) | $H_2S$ Release (ppm) |
|---|---|
| 15 | 380 |
| 25 | 100 |
| 35 | 100 |
| 45 | 5 |

As seen from Example 1 above, unmodified bitumen generates a low amount of $H_2S$ emission. Therefore, in order to show the effect of the various additives on $H_2S$ emission in this Example and the Examples below, sulfur was added to generate a greater $H_2S$ emission.

Example 3—$H_2S$ Analysis of Bitumen (Open System) Bitumen with Added Sulfur (0.02%) but without Scavenger Bitumen with added sulfur free of any scavenger was evaluated for hydrogen sulfide ($H_2S$) generation as follows. 300 g of Lion PG 64-22 bitumen was charged into a steel quart can equipped with a lid having port holes for a propeller blade, thermocouple and stopcock (for $H_2S$ measurements). The bitumen was heated to 160° C. while agitating at 300 rpm. Once the desired temperature was reached, sulfur was then added to the bitumen in an amount of 0.02% by total weight of bitumen (t=0). An $H_2S$ reading was taken after 15 minutes, with $H_2S$ measurements taken every 10 minutes for a total of 90 minutes. The results of the $H_2S$ release were as follows

TABLE 3

| $H_2S$ Release from Bitumen with sulfur additive | |
|---|---|
| Time (minutes) | $H_2S$ Release (ppm) |
| 15 | 3078 |
| 25 | 1758 |
| 35 | 1458 |
| 45 | 883 |
| 55 | 500 |
| 60 | 292 |
| 70 | 208 |
| 80 | 158 |
| 90 | 98 |

Example 4—$H_2S$ Analysis of Bitumen (Open System)—Bitumen with Sulfur and Scavenger Bitumen with added sulfur and scavenger was evaluated for hydrogen sulfide ($H_2S$) generation as follows. 300 g of Lion PG 64-22 bitumen was charged into a steel quart can equipped with a lid having port holes for a propeller blade, thermocouple and stopcock (for $H_2S$ measurements). The bitumen was heated to 160° C. while agitating at 300 rpm. Once the desired temperature was reached, sulfur was then added to the bitumen in an amount of 0.02% by total weight of bitumen (t=0). After holding at 160° C. for 15 minutes, an $H_2S$ reading was taken and scavenger (letter reference provided in the Table below) was then added at 20 minutes in an amount of 0.25% by weight of total bitumen, with $H_2S$ measurements taken every 10 minutes for a total of 90 minutes. The results of the $H_2S$ release were as follows—

TABLE 4

| | $H_2S$ Release from Bitumen with sulfur and scavenger | | | | | | |
|---|---|---|---|---|---|---|---|
| Time (minutes) | $H_2S$ Release (ppm) (C) | $H_2S$ Release (ppm) (D) | $H_2S$ Release (ppm) (E) | $H_2S$ Release (ppm) (B) | $H_2S$ Release (ppm) (F) | $H_2S$ Release (ppm) (G) | $H_2S$ Release (ppm) (H) |
| 15 | 3078 [1] | 3078 | 3078 | 3078 | 3078 | 3078 | 3078 |
| 25 | 195 | 20 | 40 | 90 | 0 | 2225 | 1800 |
| 35 | 0 [2] | 0 | 0 | 0 | 0 | 950 | 1800 |
| 45 | 0 | 0 | 0 | 0 | 0 | 195 | 1450 |
| 55 | 0 | 0 | 0 | 0 | 0 | 40 | 775 |
| 60 | 0 | 0 | 0 | 0 | 0 | 30 | 400 |
| 70 | 0 | 0 | 0 | 0 | 0 | 30 | 225 |
| 80 | 0 | 0 | 0 | 0 | 0 | 20 | 160 |
| 90 | 0 | 0 | 0 | 0 | 0 | 20 | 70 |

[1] For minute 15 only, the ppm value is the average value of all seven runs.
[2] "0" values in the table indicate values below detection level.

The above results illustrate that the addition of scavengers to unmodified bitumen results in a reduction in $H_2S$ release from the bitumen. Further, the active copper in the slurry composition according to the invention (Scavenger C) is as effective as the active copper powder (Scavengers B, D and E), although present in the bitumen in a lesser amount, Example 5 $H_2S$ Analysis of Bitumen (Open System)—Bitumen with Sulfur, PPA & Scavenger Bitumen with added sulfur and scavenger was evaluated for hydrogen sulfide ($H_2S$) generation as follows. 300 g of Lion PG 64-22 bitumen was charged into a steel quart can equipped with a lid having port holes for a propeller blade, thermocouple and stopcock (for $H_2S$ measurements). The bitumen was heated to 160° C. while agitating at 300 rpm. Once the desired temperature was reached, sulfur was then added to the bitumen in an amount of 0.02% by total weight of bitumen (t=0). After holding at 160° C. for 15 minutes, an $H_2S$ reading was taken, with $H_2S$ measurements taken every 10 minutes for a total of 90 minutes. Scavenger (letter reference provided in the Table below) was added at minute 20 in an amount of 0.25% by weight of total bitumen. At minute 30, PPA was added in an amount of 1.0% by weight of total bitumen. The results of the $H_2S$ release were as follows—

TABLE 5

| | $H_2S$ Release from Bitumen with sulfur, PPA and scavenger additives | | | | |
|---|---|---|---|---|---|
| Time (minutes) | $H_2S$ Release (ppm) (C) | $H_2S$ Release (ppm) (E) | $H_2S$ Release (ppm) (F) | $H_2S$ Release (ppm) (G) | $H_2S$ Release (ppm) (H) |
| 15 | 1383 * | 1383 | 1383 | 1383 | 1383 |
| 25 | 0 | 90 | 0 | 680 | 2000 |
| 35 | 0 | 50 | 2100 | 400 | 2000 |
| 45 | 0 | 10 | 775 | 110 | 1500 |
| 55 | 0 | 0 | 375 | 50 | 925 |
| 60 | 0 | 0 | 225 | 20 | 800 |
| 70 | 0 | 0 | 200 | 10 | 700 |

TABLE 5-continued

H$_2$S Release from Bitumen with sulfur, PPA and scavenger additives

| Time (minutes) | H$_2$S Release (ppm) (C) | H$_2$S Release (ppm) (E) | H$_2$S Release (ppm) (F) | H$_2$S Release (ppm) (G) | H$_2$S Release (ppm) (H) |
|---|---|---|---|---|---|
| 80 | 0 | 0 | 190 | 10 | 425 |
| 90 | 0 | 0 | 180 | 10 | 375 |

\* Average value at minute 15 of all five runs.

The above results illustrate that the addition of PPA to bitumen with scavenger illustrates that not all scavengers are compatible with PPA in reducing H$_2$S emissions from the bitumen.

Example 6—H$_2$S Analysis of Bitumen (Open System)—Bitumen with Added Sulfur and Scavenger Bitumen with added sulfur and scavenger was evaluated for hydrogen sulfide (H$_2$S) generation as follows. 300 g of BP PG 58-28 bitumen was charged into a steel quart can equipped with a lid having port holes for a propeller blade, thermocouple and stopcock (for H$_2$S measurements). The bitumen was heated to 160° C. while agitating at 300 rpm. Once the desired temperature was reached, the bitumen was held at that temperature for 15 minutes. Sulfur was then added to the bitumen in an amount of 0.005% by total weight of bitumen (t=0). An H$_2$S reading was taken after holding at 160° C. for 15 minutes, with H$_2$S measurements continued to be taken every 10 minutes until no H$_2$S was detected. Scavenger A was added to the bitumen in an amount of 0.4% by total weight of bitumen with mixing at minute 20. The same process was run again, but this time with Scavenger B instead of Scavenger A. The results of the H$_2$S release were as follows—

TABLE 6

H$_2$S Release from Bitumen with added sulfur and scavenger

| Time (minutes) | H$_2$S Release (ppm) (A) | H$_2$S Release (ppm) (B) |
|---|---|---|
| 15 | 520 | 600 |
| 25 | 200 | 80 |
| 34 | 35 | 8 |
| 45 | 5 | 2 |

The above results illustrate that the addition of a copper-based scavenger to bitumen modified with sulfur results in a decrease in H$_2$S release from the bitumen in both powder and dispersed form. Further, as Scavenger A has only 40% active copper scavenger compared to Scavenger. B, the above data illustrates that in a dispersed form, H$_2$S can be reduced with less active metal, and that the dispersed form distributes the scavenger throughout the bitumen more effectively than the powdered form.

The following Examples illustrate H$_2$S release from bitumen in a closed system. The above Examples were open systems, that is, the steel quart can had ports. In the closed system the bitumen was sealed as described below and heated in an oven.

Example 7—H$_2$S Analysis of Bitumen (Closed System)—Bitumen with Added Sulfur but No Scavenger Bitumen with added sulfur was evaluated for hydrogen sulfide (H$_2$S) generation as follows. A one-gallon can of BP PG 64-22 bitumen was heated to fluidity at about 177° C., and then 3298.35 g of the fluid bitumen was then poured into another can. This sample was heated to 180° C. under low shear. Once 180° C. was reached, 1.65 g of sulfur (0.05 wt %) was added for a total mixture of 3300 g, and mixed for 60 minutes while maintaining the temperature. This blend was then charged into separate steel quart cans in amounts of 500 g each (with one only having 300 g). Each quart can was capped (closed system) and then heated for about 24 hours at fluidity at about 177° C. in an oven. One can was then punctured and an H$_2$S measurement taken. The H$_2$S reading showed a release of 60,000 ppm H$_2$S from the sulfur-modified bitumen. NOTE: An H$_2$S reading of unmodified bitumen (i.e., without sulfur) only showed a nominal release of H$_2$S. Sulfur was therefore added in the Examples to artificially generate a measureable amount of H$_2$S in order to demonstrate scavenger efficacy.

Example 8—H$_2$S Analysis of Bitumen (Closed System)—Bitumen with Added Sulfur and PPA but No Scavenger Bitumen with added sulfur and PPA was evaluated for hydrogen sulfide (H$_2$S) generation as follows. A one-gallon can of BP PG 64-22 bitumen was heated to fluidity at about 177° C., and then 3281.85 g of the fluid bitumen was then poured into another can. This sample was heated to 180° C. under low shear. Once 180° C. was reached, 1.65 g of sulfur (0.05 wt %) was added and mixed for 30 minutes while maintaining the temperature. 16.5 g of PPA (0.50 wt %) was then added for a total mixture of 3300 g, and mixed for an additional 30 minutes while maintaining temperature. This blend was then charged into separate steel quart cans in amounts of 500 g each (with one only having 300 g). Each quart can was capped (closed system) and then heated to fluidity at about 177° C. in an oven and held at that temperature for 24 hours. One can was then punctured and an H$_2$S measurement taken. The H$_2$S reading showed a release of 105,000 ppm H$_2$S from the sulfur and PPA-modified bitumen, indicating that addition of PPA increases the amount of H$_2$S released.

Example 9—H$_2$S Analysis of Bitumen (Closed System)—Bitumen with Added Sulfur and Polymer but No Scavenger Bitumen with added sulfur and polymer was evaluated for hydrogen sulfide (H$_2$S) generation as follows. A one-gallon can of BP PG 64-22 bitumen was heated to fluidity at about 177° C. and then 3199.35 g of the fluid bitumen was then poured into another can. This sample was heated to 180° C. under high shear (3000-4000 rpm). Once 180° C. was reached, 99.00 g of SBS (3.0 wt % styrene-butadiene-styrene) polymer was added and mixed for 180 minutes at high shear while maintaining the temperature. 1.65 g of sulfur (0.05 wt %) was then added for a total mixture of 3300 g, and mixed for an additional 60 minutes at medium shear (2000 rpm) while maintaining temperature. This blend was then charged into separate steel quart cans in amounts of 500 g each (with one only having 300 g). Each quart can was capped (closed system) and then heated to fluidity at about 177° C. in an oven for 24 hours. One can was then punctured and an H$_2$S measurement taken. The H$_2$S reading showed a release of 31,000 ppm H$_2$S from the sulfur and polymer-modified bitumen.

Example 10—H$_2$S Analysis of Bitumen (Closed System)—Bitumen with Added Polymer, Sulfur and PPA but No Scavenger Bitumen with added polymer, sulfur and PPA was evaluated for hydrogen sulfide (H$_2$S) generation as follows. A one-gallon can of BP PG 64-22 bitumen was heated to fluidity at about 177° C., and then 3182.85 g of the fluid bitumen was then poured into another can. This sample was heated to 180° C. under high shear (3000-4000 rpm). Once 180° C. was reached, 99.00 g of SBS (3.0 wt % styrene-butadiene-styrene) polymer was added and mixed for 180 minutes at high shear while maintaining the temperature. 1.65 g of sulfur (0.05 wt %) was then added and mixed for an additional 30 minutes at medium shear (2000 rpm) while maintaining temperature. 16.5 g of PPA (0.50 wt %) was then added and mixed for an additional 30 minutes at medium shear (2000 rpm) while maintaining temperature. This blend was then charged into separate steel quart cans in amounts of 500 g each (with one only having 300 g). Each quart can was capped (closed system) and then heated to fluidity at about 177° C. in an oven and held there for 24 hours. The cans were removed from the oven and one can was then punctured and an H$_2$S measurement taken. The H$_2$S reading showed a release of 13,000 ppm H$_2$S from the polymer, sulfur and PPA-modified bitumen.

The following Examples illustrate the effect of the addition of scavenger to the four closed systems described above.

Example 11—H$_2$S Analysis of Bitumen (Closed System)—Bitumen with Added Sulfur and Scavenger Bitumen with added sulfur and two different scavengers was evaluated for hydrogen sulfide (H$_2$S) generation as follows. Two separate one-gallon cans of BP PG 64-22 bitumen were heated to fluidity at about 177° C., and then 3298.35 g of the fluid bitumen was then poured into another can. The samples were heated to 180° C. under low shear. Once 180° C. was reached, 1.65 g of sulfur (0.05 wt %) was added to each sample for a total mixture of 3300 g, and mixed for 60 minutes while maintaining the temperature. The 3300 g blends were then charged into separate steel quart cans in amounts of 500 g each (with two only having 300 g). Each quart can was capped (closed system) and then re-heated for about 20 minutes to fluidity at about 177° C. equipped in an oven. Four cans were removed from the oven and injected with one scavenger as follows

TABLE 7

Bitumen with added sulfur and scavenger

| Blend | Scavenger type and amount |
|---|---|
| PG 64-22 + 0.05% Sulfur | 0.125 wt % Scavenger C |
| | 0.250 wt % Scavenger C |
| | 0.125 wt % Scavenger F |
| | 0.250 wt % Scavenger F |

The cans were then tumbled for about 10 minutes for mixing, and then placed back in the oven for 24 hours at 177° C. Each can was then punctured and an H$_2$S measurement taken. The H$_2$S results were as follows—

TABLE 8

H$_2$S Release from Bitumen with added sulfur and scavenger

| Blend | Scavenger type and amount | H$_2$S (ppm) |
|---|---|---|
| PG 64-22 + 0.05% Sulfur | None (Ex. 11 above) | 60,000 |
| | 0.125 wt % Scavenger C | 15,000 |
| | 0.250 wt % Scavenger C | too low to detect |
| | 0.125 wt % Scavenger F | 13,000 |
| | 0.250 wt % Scavenger F | too low to detect |

The above results illustrate that different scavengers can reduce the amount of H$_2$S released from bitumen.

Example 12—H$_2$S Analysis of Bitumen (Closed System)—Bitumen with Added Sulfur, PPA and Scavenger Bitumen with added sulfur, PPA and two different scavengers was evaluated for hydrogen sulfide (H$_2$S) generation as follows. Two separate one-gallon cans of BP PG 64-22 bitumen were heated to fluidity at about 177° C., and then 3281.85 g of the fluid bitumen was then poured into another can. This sample was heated to 180° C. under low shear. Once 180° C. was reached, 1.65 g of sulfur (0.05 wt %) was added and mixed for 30 minutes while maintaining the temperature. 16.5 g of PPA (0.50 wt %) was then added for a total mixture of 3300 g, and mixed for an additional 30 minutes while maintaining temperature. The 3300 g blends were then charged into separate steel quart cans in amounts of 500 g each (with two only having 300 g). Each quart can was capped (closed system) and then re-heated for about 20 minutes to fluidity at about 177° C. equipped in an oven. Four cans were removed from the oven and injected with one scavenger as follows

TABLE 9

Bitumen with added sulfur, PPA and scavenger

| Blend | Scavenger type and amount |
|---|---|
| PG 64-22 + 0.05% Sulfur + 0.50% PPA | 0.125 wt % Scavenger C |
| | 0.250 wt % Scavenger C |
| | 0.125 wt % Scavenger F |
| | 0.250 wt % Scavenger F |

The cans were then tumbled for about 10 minutes for mixing, and then placed back in the oven for 24 hours at 177° C. Each can was then punctured and an H$_2$S measurement taken. The H$_2$S results were as follows

TABLE 10

H$_2$S Release from Bitumen with added sulfur, PPA and scavenger

| Blend | Scavenger type and amount | H$_2$S (ppm) |
|---|---|---|
| PG 64-22 + 0.05% Sulfur + 0.50% PPA | None (Ex. 12 above) | 105,000 |
| | 0.125 wt % Scavenger C | 7,500 |
| | 0.250 wt % Scavenger C | 700 |
| | 0.125 wt % Scavenger F | 90,000 |
| | 0.250 wt % Scavenger F | 85,000 |

The above results illustrate that Scavenger C (according to the present invention) can reduce the amount of H$_2$S released from bitumen when modified with PPA and sulfur, whereas a commercially available Scavenger F cannot.

Example 13—H$_2$S Analysis of Bitumen (Closed System)—Bitumen with Added Polymer, Sulfur and Scavenger Bitumen with added polymer, sulfur and Scavenger C was evaluated for hydrogen sulfide (H$_2$S) generation as follows. A one-gallon can of BP PG 64-22 bitumen was heated to fluidity at about 177° C., and 3199.35 g of the fluid bitumen was then poured into another can. This sample was heated to 180° C. under high shear (3000-4000 rpm). Once 180° C. was reached, 99.00 g of SBS (3.0 wt % styrene-butadiene-styrene) polymer was added and mixed for 180 minutes at high shear while maintaining the temperature. 1.65 g of sulfur (0.05 wt %) was then added for a total mixture of 3300 g, and mixed for an additional 60 minutes at medium shear (2000 rpm) while maintaining temperature. The 3300 g blends were then charged into separate steel quart cans in amounts of 500 g each (with one only having 300 g). Each quart can was capped (closed system) and then re-heated for about 20 minutes to fluidity at about 177° C. equipped in an oven. Two cans were removed from the oven and injected with Scavenger C as follows—

TABLE 11

Bitumen with added sulfur, polymer and scavenger

| Blend | Scavenger type and amount |
|---|---|
| PG 64-22 + 3.00% SBS + 0.05% Sulfur | 0.125 wt % Scavenger C<br>0.250 wt % Scavenger C |

The cans were then tumbled for about 10 minutes for mixing, and then placed back in the oven for 24 hours at 177° C. Each scavenger added can was then punctured and an H$_2$S measurement taken. The H$_2$S results were as follows—

TABLE 12

H$_2$S Release from Bitumen with added sulfur, polymer and scavenger

| Blend | Scavenger type and amount | H$_2$S (ppm) |
|---|---|---|
| PG 64-22 + 3.00% SBS + 0.05% Sulfur | None (Ex. 13 above) | 31,000 |
| | 0.125 wt % Scavenger C | 2,000 |
| | 0.250 wt % Scavenger C | too low to detect |

The above results illustrate that Scavenger C (according to the present invention) can reduce the amount of H$_2$S released from bitumen when modified with polymer cross-linked with sulfur.

Example 14—H$_2$S Analysis of Bitumen (Closed System)—Bitumen with Added Polymer, Sulfur, PPA and Scavenger Bitumen with added polymer, sulfur, PPA and Scavenger C was evaluated for hydrogen sulfide (H$_2$S) generation as follows. A one-gallon can of BP PG 64-22 bitumen was heated to fluidity at about 177° C., and then 3182.85 g of the fluid bitumen was then poured into another can. This sample was heated to 180° C. under high shear (3000-4000 rpm). Once 180° C. was reached, 99.00 g of SBS (3.0 wt % styrene-butadiene-styrene) polymer was added and mixed for 180 minutes at high shear while maintaining the temperature. 1.65 g of sulfur (0.05 wt %) was then added and mixed for an additional 60 minutes at medium shear (2000 rpm) while maintaining temperature. 16.5 g of PPA (0.50 wt %) was then added and mixed for an additional 30 minutes at medium shear (2000 rpm) while maintaining temperature. The 3300 g blends were then charged into separate steel quart cans in amounts of 500 g each (with two only having 300 g). Each quart can was capped (closed system) and then re-heated for about 20 minutes to fluidity at about 177° C. equipped in an oven. Two 500 g cans were removed from the oven and injected with Scavenger C as follows—

TABLE 13

Bitumen with added sulfur, polymer, PPA and scavenger

| Blend | Scavenger type and amount |
|---|---|
| PG 64-22 + 3.00% SBS + 0.05% Sulfur + 0.50% PPA | 0.125 wt % Scavenger C<br>0.250 wt % Scavenger C |

The cans were then tumbled for about 10 minutes for mixing, and then placed back in the oven for 24 hours at 177° C. Each can was then punctured and an H$_2$S measurement taken. The H$_2$S results were as follows—

TABLE 14

H$_2$S Release from Bitumen with added sulfur, polymer, PPA and scavenger

| Blend | Scavenger type and amount | H$_2$S (ppm) |
|---|---|---|
| PG 64-22 + 3.00% SBS + 0.05% Sulfur + 0.50% PPA | None (Ex. 14 above) | 13,000 |
| | 0.125 wt % Scavenger C | 9,800 |
| | 0.250 wt % Scavenger C | 1,400 |

The above results illustrate that Scavenger C (according to the present invention) can reduce the amount of H$_2$S released from bitumen when modified with crosslinked polymer and PPA.

The scavenger composition according to the present invention as described above affords several advantages over powdered scavengers. These include (a) ease of metering into bitumen or asphalt, as a liquid scavenger composition is easier to meter than a powdered one; (b) elimination or reduction of dust potential; (c) the ability to inject the liquid composition to counter pressure build-up in piping, as liquids are substantially non-compressible; and (d) as previously noted, the compatibility of the copper salt or chelate component with PPA.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

We claim:

1. A scavenger composition for reducing hydrogen sulfide emissions from asphalt comprising:
    a carrier in an amount of about 1.0 wt % to about 99.0 wt. %, based on total weight of the composition,
    a dispersant in an amount of about 0.01 wt % to about 10.0 wt. %, based on total weight of the composition, and
    an active metal in an amount of about 99.0 wt % to about 1.0 wt. %, based on total weight of the composition, wherein the dispersant is chosen from sodium acid pyrophosphate, sodium polysulfonate, sodium alkyl sulfosuccinate, soy lecithin, hydroxyl-functional carboxylic acid esters, salts of unsaturated polyamine amides and lower molecular weight acidic polyesters, and alkyl amine sulfonates, and wherein the active metal is a metal salt or metal chelate, and wherein the metal is chosen from iron, copper, molybdenum, nickel and zinc.

2. The scavenger composition according to claim 1 further comprising:
a suspension aid.

3. The scavenger composition according to claim 2 wherein the suspension aid is present in an amount of about 0.01 wt % to about 10.0 wt. %, based on total weight of the composition.

4. The scavenger composition according to claim 1 wherein the active metal is about 100 microns or less in diameter.

5. The scavenger composition according to claim 1 wherein the active metal is chosen from copper aspartate; copper carbonate; copper citrate; copper gluconate; copper bis-glycinate; copper oxides; copper oxalate; copper sulfate; iron aspartate; iron bis-glycine; iron citrate; iron fumarate; iron gluconate; iron bis-glycinate; iron sulfate; molybdenum aspartate; molybdenum bis-glycine; molybdenum citrate; molybdenum fumarate; molybdenum gluconate; molybdenum glycinate; molybdenum sulfate; nickel aspartate; nickel bis-glycine; nickel citrate; nickel fumarate; nickel gluconate; nickel bis-glycinate; nickel sulfate; zinc acetate; zinc arginate; zinc ascorbate; zinc aspartate; zinc carboxylate; zinc gluconate; zinc bis-glycinate; zinc methionate; zinc oxide; zinc picolinate; and zinc sulfate.

6. The scavenger composition according to claim 1 wherein the active metal is a copper-based active metal.

7. Bitumen or asphalt comprising the scavenger composition according to claim 1.

8. Bitumen or asphalt according to claim 7, wherein the bitumen or asphalt is further modified with polyphosphoric acid and the active metal is a copper-based active metal.

9. Bitumen or asphalt according to claim 8, wherein hydrogen sulfide emissions from the bitumen or asphalt when heated to 100° C. or greater are about 10 ppm or less.

10. The scavenger composition according to claim 2 wherein the suspension aid is chosen from polysaccharides, fumed silica, modified bentonite, hectorites, castor oil derivatives, polyamides, polyolefins, and polyacrylates.

11. The scavenger composition according to claim 5, wherein the active metal is chosen from copper aspartate; copper carbonate; copper citrate; copper gluconate; copper bis-glycinate; copper oxides; copper oxalate; and copper sulfate.

12. The scavenger composition according to claim 1, wherein the carrier is chosen from glycerol, polypropylene glycol, polyethylene glycol, white mineral oil, mineral spirits, hydrotreated light petroleum distillate, white spirits, Stoddard solvent, aliphatic naphtha, and hydrotreated heavy petroleum distillate.

13. A method of reducing hydrogen sulfide emissions from asphalt or bitumen comprising adding to the asphalt or bitumen a scavenger composition comprising:
a carrier present in an amount of about 1.0 wt % to about 99.0 wt. %, based on total weight of the composition,
a dispersant present in an amount of about 0.01 wt % to about 10.0 wt. %, based on total weight of the composition, wherein the dispersant is chosen from sodium acid pyrophosphate, sodium polysulfonate, sodium alkyl sulfosuccinate, soy lecithin, hydroxyl-functional carboxylic acid esters, salts of unsaturated polyamine amides and lower molecular weight acidic polyesters, and alkyl amine sulfonates, and
an active metal present in an amount of about 99.0 wt % to about 1.0 wt. %, based on total weight of the composition,
wherein the active metal is a metal salt or metal chelate, and wherein the metal is chosen from iron, copper, molybdenum, nickel, and zinc.

14. The method according to claim 13, wherein the scavenger composition further comprises a suspension aid.

15. The method according to claim 14, wherein the suspension aid is present in an amount of about 0.01 wt % to about 10.0 wt %, based on total weight of the composition.

16. The method according to claim 13, wherein the bitumen or asphalt is further modified with polyphosphoric acid and the active metal is a copper-based active metal.

17. A scavenger composition for reducing hydrogen sulfide emissions from asphalt comprising:
a carrier in an amount of about 1.0 wt % to about 99.0 wt. %, based on total weight of the composition, wherein the carrier is chosen from glycerol, polypropylene glycol, polyethylene glycol, white mineral oil, mineral spirits, hydrotreated light petroleum distillate, white spirits, Stoddard solvent, aliphatic naphtha, hydrotreated heavy petroleum distillate, and combinations thereof,
an active metal in an amount of about 99.0 wt % to about 1.0 wt. %, based on total weight of the composition, wherein the active metal is a metal salt or metal chelate, and wherein the metal is chosen from iron, copper, molybdenum, nickel, and zinc, and
a suspension aid in an amount of about 0.01 wt % to about 10.0 wt. %, based on total weight of the composition, wherein the suspension aid is chosen from polysaccharides, fumed silica, modified bentonite, hectorites, castor oil derivatives, polyamides, polyolefins, polyacrylates, and combinations thereof.

18. The scavenger composition according to claim 17, wherein the active metal is a particle or powder having a diameter of about 100 microns or less.

\* \* \* \* \*